United States Patent [19]

Sartori et al.

[11] Patent Number: 4,525,294

[45] Date of Patent: * Jun. 25, 1985

[54] AMINO ACID MIXTURES, THEIR ALKALI METAL SALTS AND PROCESS FOR PREPARING SAME

[75] Inventors: Guido Sartori, Linden; Warren A. Thaler, Aberdeen, both of N.J.

[73] Assignee: Exxon Research and Engineering Co., Florham Park, N.J.

[*] Notice: The portion of the term of this patent subsequent to Sep. 20, 2000 has been disclaimed.

[21] Appl. No.: 484,943

[22] Filed: Apr. 14, 1983

Related U.S. Application Data

[63] Continuation-in-part of Ser. No. 321,058, Nov. 13, 1981, abandoned.

[51] Int. Cl.³ .................... C09K 3/00; H05B 33/00
[52] U.S. Cl. .................... 252/182; 252/189; 252/192; 423/222; 423/223; 423/226; 562/433; 562/443; 562/507; 562/553; 562/567; 562/575
[58] Field of Search ............... 562/433–458, 562/553–575, 507; 252/182, 189, 192; 423/223, 226, 222; 260/455, 471 C, 583 R

[56] References Cited

U.S. PATENT DOCUMENTS

| 3,448,153 | 6/1969 | Cavitt et al. | |
| 3,894,036 | 7/1975 | Abu-el-Haj et al. | |
| 3,933,843 | 1/1976 | Abu-el-Haj et al. | |
| 3,939,174 | 2/1976 | Abu-el-Haj et al. | 260/308 A |
| 4,002,636 | 1/1977 | Abu-el-Haj et al. | 260/306.7 T |
| 4,112,050 | 9/1978 | Sartori et al. | 423/223 |
| 4,190,601 | 2/1980 | Decker et al. | 260/583 R |
| 4,376,101 | 3/1983 | Sartori et al. | 423/223 |
| 4,376,102 | 3/1983 | Thaler et al. | 423/233 |
| 4,405,577 | 9/1983 | Sartori et al. | 423/233 |
| 4,405,578 | 9/1983 | Sartori et al. | 423/223 |
| 4,405,579 | 9/1983 | Sartori et al. | 423/223 |
| 4,405,584 | 9/1983 | Foroulis | 423/228 |
| 4,405,586 | 9/1983 | Sartori et al. | 423/233 |
| 4,432,985 | 2/1984 | Nadzan et al. | 424/267 |

FOREIGN PATENT DOCUMENTS 0081301 6/1983 European Pat. Off. .
1305718 2/1973 United Kingdom .

OTHER PUBLICATIONS

Chem. Abstracts 61:13186h (RN23590-02-5).
Ibutani, Y., Bull. Chem. Soc. Japan, vol. 42(8), pp. 2330–2332, (1969), (CA71(19)91835f).
Wilson, D. W. et al., J. Med. Chem., vol. 19(3), pp. 381–384, (1976), (CA84(15)99138v).
Kirino et al., Agric. Biol. Chem., 44(1), 31, (1980).
Bowman, J. Chem. Soc., 1346, (1950).
Wolman et al., Proc. Nat. Acad. Sci. U.S.A. 1972, 89(1), 808–11.

Primary Examiner—Christine M. Nucker
Assistant Examiner—M. Moskowitz
Attorney, Agent, or Firm—Albert P. Halluin; Henry E. Naylor

[57] ABSTRACT

The present invention relates to the preparation of mixtures of sterically hindered substituted N-secondary amino acids or their alkali metal salts by a one-step reductive condensation of an amino acid or its alkali metal salt containing a primary amino group and a ketone to thereby form a mono-substituted amino acid or alkali metal salt thereof, followed by preparing the corresponding sterically hindered tertiary amino acids or alkali metal salt thereof by reacting the mono-substituted amino acids or alkali metal salt thereof with an unhindered aldehyde under reducing conditions in the presence of a hydrogenating catalyst. The novel mixtures of the sterically hindered mono-substituted amino acids and the tertiary amino acids and their alkali metal salts are useful promoters for alkaline salts in "hot pot" acid gas scrubbing processes.

6 Claims, No Drawings

AMINO ACID MIXTURES, THEIR ALKALI METAL SALTS AND PROCESS FOR PREPARING SAME

CROSS REFERENCE TO RELATED APPLICATIONS

This application is a continuation-in-part application of Ser. No. 321,058, filed Nov. 13, 1981, now abandoned.

BACKGROUND OF THE INVENTION

1. Field of the Invention

The present invention relates to sterically hindered mono-substituted amino acids and alkali metal salts thereof and their preparation by a one-step reductive condensation of an amino acid or alkali metal salt thereof and a ketone. It also relates to tertiary amino acids and their preparation by reacting the sterically hindered mono-substituted amino acid or alkali metal salt thereof with an aldehyde to produce the corresponding tertiary amino acid alkali metal salt thereof. The sterically hindered mono-substituted amino acids, the tertiary amino acids, alkali metal salt thereof and their mixtures are useful promoters for alkaline salts in "hot pot" acid gas scrubbing processes.

2. Description of Related Patents and Publications

Recently, it was shown in U.S. Pat. No. 4,112,050 that sterically hindered amines are superior to diethanolamine (DEA) as promoters for alkaline salts in the "hot pot" acid gas treating process. U.S. Pat. No. 4,094,957 describes an improvement to the '050 process whereby amino acids, especially sterically hindered amino acids serve to prevent phase separation of the aqueous solution containing sterically hindered amines at high temperatures and low fractional conversions during the acid gas scrubbing process.

One of the preferred sterically hindered amines described in these patents is N-cyclohexyl-1,3-propanediamine. This amine, while providing good performance in the acid gas scrubbing process, has a tendency to form an insoluble cyclic urea, especially in the presence of $H_2S$ which is often found in industrial acid gases. See, for example, U.S. Pat. Nos. 4,180,548 and 4,183,903. In addition, one of the preferred amino acids described in U.S. Pat. No. 4,094,957 is pipecolinic acid. It provides good results, but is difficult to prepare and rather expensive.

British Pat. No. 1,305,718 describes the use of beta or gamma amino acids as promoters in the "hot pot" acid gas treating process. However, these amino acids are not suitable because the beta-amino acids undergo de-amination when heated for some time in aqueous potassium carbonate and the gamma amino acids under the same conditions form insoluble lactams. Also, the alpha-amino acid, N-cyclohexyl glycine, as described in Belgian Pat. No. 767,105, forms an insoluble diketopiperazine when heated in an aqueous solution containing potassium carbonate.

In view of the commercial potential of using the sterically hindered amino compounds as described and claimed in U.S. Pat. Nos. 4,094,957 and 4,112,050, especially the amino acids, there is a need for providing less expensive amino acids for potential use in this new acid gas scrubbing process. Also, there is a need to find a more suitable alternative to N-cyclohexyl-1,3-propanediamine which performs as well, but does not degrade or form insoluble or undesirable by-products.

It has recently been discovered that certain lower aliphatic sterically hindered monosubstituted amino acids derived from glycine or alanine, especially N-secondary butyl glycine, are quite useful as promoters in the "hot pot" acid gas scrubbing process. These amino acids may be used alone, as co-solvents for other hindered amines, such as N-cyclohexyl-1,3-diamine, or in admixture with tertiary amino acids as hereinafter described. These sterically hindered mono-substituted amino acids not only perform well, but do not form undesirable by-products.

N-secondary butyl glycine has the CAS Registry Number of 58695-42-4 and is mentioned as an intermediate in U.S. Pat. Nos. 3,894,036; 3,933,843; 3,939,174 and 4,002,636, as well as the published literature (Kirino et al., *Agric. Biol. Chem.*, 44(1), 31 (1980). Nothing is said in these disclosures about the synthesis of this amino acid.

Existing processes for producing amino acids, particularly for preparing sterically hindered amino acids frequently involve the use of either expensive starting materials, a plurality of synthesis steps, or costly recovery procedures, either of which may result in high costs to the end-user.

The scientific literature contains a few references showing the preparation of salts of N-secondary alkyl glycines or alanines. For example, Wessely et al., *Monatsh. Chem.*, 81, 861 (1950) describe the preparation of the hydrochloride salt of N-secondary butyl glycine starting from secondary butylamine and glycolonitrile. Greco et al., *J. Med. Pharm. Chem.*, 5, 861 (1962), also isolated the hydrochloride of the amino acid, prepared by reacting the secondary butylamine with ethyl bromoacetate and hydrolyzing the resulting ester with an acid.

The scientific and patent literature contains references to the reaction of aldehydes and ketones with primary and secondary amino compounds. For example, Bowman, *J. Chem. Soc.* 1346 (1950), Tegner et al., *Acta Chem. Scand.* 15, 1180 (1961) and Ikutani, *Bull. Chem. Soc. Japan*, 42, 2330 (1969) describe reductive condensations of amino acids with aldehydes. Glycine, however, reacts with linear aldehydes to give N,N-dialkylamino acids. Branched aldehydes give a mixture of mono- and dialkylderivatives. As an example, isobutyraldehyde reacts with glycine to give N-isobutylglycine and N,N-diisobutylglycine. Also, alanine reacts with linear aldehydes to give mono- or dialkylation, depending on the temperature employed. Branched aldehydes, such as isobutyraldehyde, give only monosubstituted amino acids, e.g., N-monoisobutylalanine.

Reductive alkylations of amino compounds with aldehydes and ketones are also generally described in *Organic Reactions*, "Preparation of Amines by Reductive Alkylation", Vol. 14, pp. 174–255. Some other examples of these reactions include: U.S. Pat. No. 2,000,034 which discloses the preparation of N-isopropyl-p-aminophenol by the catalytic reduction of p-aminophenol dissolved in acetone; Major, *J. Am. Chem. Soc.*, 53, 4373 (1931) which describes the preparation of N,N-dialkylphenylene diamines from p-phenylene diamine and aldehydes or ketones; and Herada et al., *Chem. Abs.* 85, 46174 (1976) which reports on similar preparations from p-phenylene diamine and higher ketones by catalytic reduction of the intermediate Schiff bases.

Other disclosures of interest include U.S. Pat. No. 4,190,601 which discloses the reductive alkylation of secondary amines with either aliphatic aldehydes or aliphatic ketones, Skita et al., *Ann.* 453, 190 (1927) which describes the synthesis of N-alkyl amino acids or their derivatives by reductive condensation (e.g., it shows the reaction of pyruvic acid and an amine or amine derivative); *Houben-Weyl*, vol. 11, part 2, page 327 (Scheibler and Baumgarten, *Ber.* 55, 1358 (1922)) which describes the reaction of the bisulfite derivative of acetone with the ethyl ester of glycine.

SUMMARY OF THE INVENTION

It has now been discovered that mono-substituted amino acids and alkali metal salts thereof such as N-secondary hydrocarbyl and substituted hydrocarbyl glycines and alanines and their alkali metal salts can be easily prepared in one step by reacting an amino acid or alkali metal salts thereof having a primary amino group and a ketone under reductive condensation conditions in the presence of a reductant and a catalytically effective amount of hydrogenation catalyst at an elevated temperature and at superatmospheric conditions. This process provides high yields of the sterically hindered mono-substituted amino acid or alkali metal thereof with minimal formation of by-products (e.g., disubstituted products) and allows for the use of inexpensive and uncomplicated procedures to separate the product. Unexpectedly, only the mono-substituted amino acid or alkali metal salt thereof is produced, even when an excess of ketone is employed. As such, the mono-substituted amino acid and alkali metal salts thereof can be prepared directly in a pure state without going through the hydrochloride salt of the acid.

As another embodiment of the invention, the mono-substituted amino acid product or its alkali metal salt is reacted with an unhindered aldehyde in the presence of a reductant and a catalytically effective amount of a hydrogenation catalyst at elevated temperatures and at superatmospheric conditions to produce thereby the corresponding tertiary amino acid. The reductive alkylation can be carried out in the same reactor as used for preparing the mono-substituted amino acid and under the same conditions, by simply adding the aldehyde to the reactor after the reductive condensation with the amino acid and ketone is complete. A mixture of the mono-substituted and tertiary amino acid or alkali metal salt thereof can be prepared by simply controlling the proportion of reactants in the second reaction.

Another aspect of the invention includes, as a composition, the mixture of N-secondary hydrocarbyl or substituted hydrocarbyl glycine or alanine and N-secondary hydrocarbyl, N-alkyl glycine or alanine and their alkali metal salts. This novel mixture, conveniently prepared by the process of the invention, is a superior promoter in the "hot pot" acid gas scrubbing process and it is stable against degradation. The mole ratio of the amino acids may vary greatly, depending upon the conditions used. Preferably, the mole ratio will range from 1:3 to 3:1, more preferably 1:1. The mixture may also include other ingredients such as alkaline salts such as potassium carbonate which are used in the "hot pot" acid gas treating process. The amount of alkaline salt will generally range from 5 to about 40 weight percent, based on the total weight of the composition. The composition may also include other materials such as corrosion inhibitors, and the like. The need for antifoaming agents is not as great as with other promoters, a particularly useful advantage of this new composition.

Still another aspect of the invention pertains to novel secondary and tertiary amino acids and their alkali metal salts which are useful in gas treating processes.

PREFERRED EMBODIMENTS

The preferred process of the invention involves the reductive condensation of glycine or alanine and their alkali metal salts with a ketone in the presence of a reductant such as hydrogen and a catalytically effective amount iof a hydrogenation catalyst.

The reaction may be illustrated by the following general equation:

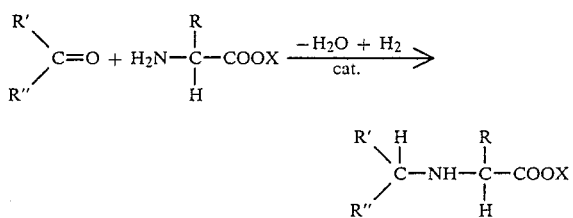

wherein R is hydrogen or methyl, X is hydrogen or an alkali metal, such as sodium or potassium, and R' and R" are:

(a) substituted or unsubstituted, linear or branched alkyl radicals having one to twenty carbon atoms, preferably from one to eight carbon atoms, such as methyl, ethyl, propyl, isopropyl, butyl, iso-butyl, sec.-butyl, pentyl, iso-pentyl, hexyl, isohexyl, heptyl, iso-heptyl, octyl, iso-octyl, decyl, undecyl, pentadecyl, eicosyl and the like; or (b) when R' and R" are taken together, they may be substituted or unsubstituted alkylene radicals having from three to six carbon atoms, such as trimethylene, tetramethylene, pentamethylene, and the like forming a cyclic ketone such as cyclobutanone, cyclopentanone, cyclohexanone and the like; or (c) substituted or unsubstituted cycloalkyl radicals having from four to eight ring carbon atoms, such as cyclopentyl, cyclohexyl, 2-methyl-cyclohexyl, cyclooctyl and the like; or (d) substituted or unsubstituted hydroxyalkyl radicals, linear or branched, having from one to twenty carbon atoms, preferably from one to eight carbon atoms, such as hydroxymethyl, hydroxyethyl, hydroxybutyl, hydroxyoctyl, hydroxydecyl, hydroxyeicosyl and the like; or (e) substituted or unsubstituted aralkyl radicals having from seven to twenty carbon atoms, preferably from seven to twelve carbon atoms, such as benzyl, phenethyl, 4-methylbenzyl and the like.

The R' and R" groups may be substituted with a wide variety of substituent groups. Typical substituents include groups such as hydroxyl, ether linkages, silane groups, and heterocyclic rings containing oxygen atoms in their rings. Such groups are selected, of course, such that they will not interfere with the reductive condensation process.

Illustrative ketones suitable for use in the invention include: acetone, 2-butanone, 2-pentanone, 3-pentanone, 2-hexanone, 3-hexanone, 2-heptanone, 3-heptanone, 4-heptanone, 2-octanone, 3-octanone, 4-octanone, nonanones, decanones, cyclopentanone, cyclohexanone, cycloheptanone, cyclooctanone, methylisopropylketone, methylisobutylketone, methyltertiarybutylketone, diisopropylketone, diisobutylketone, ethylisopropylketone, ethylisobutylketone, ethyltertiarybutylketone, methylsecondaryamylketone, ethylsecondaryamylketone, methyltertiaryamylketone, methylsecondaryamylketone or mixtures of these ketones.

The amino acids used in the process are those containing a primary amino functionality such as glycine or alanine or their alkali metal salts.

The hydrogenation catalyst to be used in the process of the invention may include any of the known hydrogenation catalysts. Illustrative hydrogenation catalysts include platinum, palladium and other platinum metals such as ruthenium, rhodium, osmium and iridium deposited on inert supports such as carbon, silica and other refractory oxides, Raney nickel, nickel-on-kieselguhr, copper chromite, nickel on inert support, massive nickel coprecipitated with silicate or aluminum salts having alumina or kieselguhr supports. The preferred catalyst is palladium on carbon.

The concentration of the hydrogenation catalyst is that which is catalytically effective and that amount will generally range from about 0.1 weight percent to 10 weight percent, preferably from about 2 weight percent to 8 weight percent, based on the total weight of the ketone, amino acid and solvent charged in the reactor. The normal pretreatment conditions and handling of the hydrogenation catalyst should be practiced as known to those skilled in the hydrogenation catalysts art.

The theoretical equivalent mole ratio of ketone to amino acid or alkali metal salt thereof in the reaction charge is 1:1. However, in practice, an excess of ketone is used and therefore the mole ratio generally varies from 1.1 to 10:1, preferably from 1.2 to 8:1, most preferably from 1.1 to 1.5:1. As discussed above, even the use of excess ketone results only in mono-substituted N-secondary amino acid or its alkali metal salt.

The reductive condensation reaction is carried out under pressure at a temperature ranging from about 20° C. to 200° C., preferably from about 50° C. to 150° C. As the temperature is decreased, the hydrogenation rate also decreases allowing incomplete conversion and by-product formation. As the temperature is increased, the hydrogenation rate generally increases and allows for complete reaction of the reactants.

The reductive condensation of the ketone and amino acid should be carried out at superatmospheric pressures, preferably from about 3.5 to 210.9 kg/cm$^2$, more preferably from 35.2 to 105.4 kg/cm$^2$. A greater hydrogenation pressure will not hinder the reaction. Lower hydrogenation pressures may result in slower hydrogenation rates and incomplete conversions.

It is often desirable to include in the reaction medium an inert solvent, preferably a polar solvent such as water, or an aliphatic alcohol. Preferred alcohols include methanol, ethanol, isopropanol and the like. The solvent should be of low molecular weight to facilitate removal from the product of the reaction. The amount of the solvent may vary, but will generally range from about 10 to 50 wt%, preferably from 15 to 30 wt%, based on the weight of reactants used. When the solvent is water, the water in the reaction mixture helps solubilize the amino acids. Typically, the amino acid charged into the reactor will be dissolved in water and the ketone will be dissolved in the solvent which may include water and/or an organic polar solvent such as an aliphatic alcohol.

In carrying out the reductive condensation, a reductant is supplied to the reactor. The reductant may be hydrogen or a hydrogen-generating compound, preferably hydrogen.

It has been observed that the time required for the complete cessation of the hydrogen absorption in the laboratory experiments at the preferred conditions is usually about 4–8 hours. The time required in a particular reaction will vary and is dependent upon specific reactants, catalyst, temperature and pressure used, as well as the size of the batch, as is known to those skilled in the art. The hydrogenation may be terminated prior to the cessation of hydrogen absorption although this leads to a lesser yield of mono-substituted amino acid.

Once the reaction has been completed, the mono-substituted amino acid can be conveniently recovered by known techniques such as solvent evaporation and/or addition of a precipitant.

Unexpectedly, the resulting sterically hindered mono-substituted amino acid will not react further even when excess ketone is used. This is contrary to other similar processes involving the condensation of carbonyl compounds and amino compounds. For example, aldehydes typically provide disubstitution.

If it is desired to prepare a tertiary amino acid from the mono-substituted amino acid, one then subjects the mono-substituted amino acid to reductive alkylation with an unhindered substituted or unsubstituted aldehyde, preferably an aldehyde having from one to twenty carbon atoms. More preferably the aldehyde has one to six carbon atoms, and still more preferably one to two carbon atoms. In this manner, both the secondary and tertiary amino acid can be synthesized from simple amino acids such as glycine or alanine. The mixture can be prepared in one pot, if desired, by simply adding the aldehyde after the ketone-amino acid condensation reaction is completed.

As such, a mixture of amino acids represented by the following formulae is obtained:

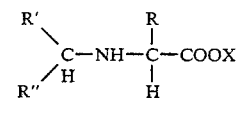

and

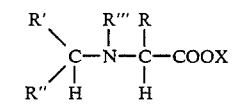

wherein R is hydrogen or methyl, X is hydrogen or an alkali metal, such as sodium or potassium, and R' and R'' are selected from the group consisting of:

(a) substituted or unsubstituted, linear or branched alkyl radicals having one to twenty carbon atoms; or (b) substituted or unsubstituted alkylene radicals each having three to six carbon atoms and combined to form a cyclic ring; or (c) substituted or unsubstituted cycloalkyl radicals having from four to eight ring carbon atoms; or (d) substituted or unsubstituted hydroxyalkyl radicals, linear or branched, having from one to twenty carbon atoms; or (e) substituted or unsubstituted aralkyl radicals having from seven to twenty carbon atoms, and wherein R''' is selected from substituted or unsubstituted linear alkyl radicals having from one to twenty carbon atoms.

The mole ratio of the two amino acids may widely vary, but preferably ranges from 1:3 to 3:1, and more preferably is 1:1.

The preferred amino acids will be those where R is hydrogen or a methyl radical, and R' and R" are each selected from $C_1$–$C_6$ hydrocarbon radicals and R''' is a methyl or ethyl radical. The most preferred amino acids will be those where R is hydrogen, R' and R" are each selected from $C_1$–$C_3$ hydrocarbon radicals and R''' is a methyl radical. A particularly preferred mixture includes N-secondary butyl glycine and N-secondary butyl N-methyl glycine.

Alternatively, the reaction of the sterically hindered mono-substituted amino acid or its alkali metal salt and the aldehyde may be carried to completion. As such, the corresponding tertiary amino acid or alkali metal salt, as defined above, may be recovered and used as a promoter or co-solvent for sterically hindered amines in "hot pot" acid gas treating processes or as catalyst for epoxide or thioepoxide resins.

The reaction conditions for preparing the tertiary amino acids and alkali metal salts thereof are typically the same as described above for the amino acid-ketone condensation reaction.

The invention is illustrated further by the following examples which, however, are not to be taken as limiting in any respect. All parts and percentages, unless expressly stated to be otherwise, are by weight.

EXAMPLE 1

Synthesis of N-sec. Butyl Glycine

The following reagents are charged into a 1-gallon autoclave:
338 g of glycine (4.5 mols)
1 liter of deionized water
500 ml of ethanol
360 g of methylethylketone (5 mols)
20 g of 10% Pd on charcoal The autoclave is closed and hydrogenation is carried out at 70°–75° C., while keeping the total pressure at 63.3–70.3 kg/cm$^2$ for 6.5 hours. The total pressure corresponds to 71.7 kg/cm$^2$. After cooling, the autoclave is discharged, the reaction mixture is heated to boiling and the catalyst is separated by filtration. The filtrate is evaporated to about 1.2 liters, cooled to room temperature and treated with an excess of acetone. The solid that precipitates is separated by filtration and dried in vacuo. TLC shows that unreacted glycine is still present. The acetone solution is evaporated to dryness; TLC of the residue shows the presence of unreacted glycine.

The combined solids are put back into the autoclave, together with 1 liter of methanol, 1.5 liters of deionized water, 200 ml of methyl ethyl ketone and 20 g of 10% Pd on charcoal.

Hydrogenation is carried out at 70°–80° C. at 63.3–70.3 kg/cm$^2$ for 3.5 hours. The pressure is about 17.6 kg/cm$^2$. After cooling, the autoclave is opened, the content is heated to boiling and the catalyst is separated by filtration. The filtrate is concentrated to about 1 liter, then diluted to 4 liters with acetone. On the following day the solid is separated by filtration and dried in vacuo. The weight is 520 g (corresponding to an 88% yield). TLC shows the presence of only traces of glycine. The elemental analysis is as follows:

calc: C=54.9%; H=9.99%; N=10.7%; found: C=54.8%; H=9.89%; N=10.9%.

The product melts at 178° C. (dec.)

EXAMPLE 2

Synthesis of N-sec. Butyl Alanine 356 g of alanine (4 mols) is dissolved in 1.5 liters of deionized water and put into a 1-gallon autoclave. 25 g of 10% Pd on carbon, wet with water, 423 g of methylethylketone (5.85 mols) and 250 ml of ethanol are added. The autoclave is closed and hydrogenation is carried out at 90°–105° C. and 63.3–77.3 kg/cm$^2$. A pressure drop corresponding to 83.3 kg/cm$^2$ is observed in the course of 4 hours. The autoclave is allowed to cool overnight.

The content is filtered at 60° C. through a precoated funnel. The filtrate is evaporated from 2.4 to 1.5 liters, then diluted with 3.5 liters of acetone and stored in a freezer for 3 hours. The precipitate is separated by filtration on a Büchner funnel and dried. 425 g of solid is obtained. Thin-layer chromatography shows good purity. The elemental analysis gives the following values:
C=56.60%; N=10.42%; H=10.15%;
the theoretical values being
C=57.9%; N=9.65%; H=10.41%.

The mass spectrum shows a weak parent peak at 145 m/e and intense peaks at 116, 100, 84, 70 and 145 m/e 44 m/e. The m.p. is 265° C. dec).

EXAMPLE 3

Synthesis of N-(2-amyl)-glycine

The following reagents are charged into a 1-gallon autoclave:
300 g of glycine (4 mols), dissolved in 1 liter of water
450 g of 2-pentanone (5.2 mols), dissolved in 1 liter of ethanol
22.5 g of 10% Pd on carbon, wet with water Hydrogenation is carried out at 51–70.3 kg/cm$^2$, starting at 45° C. and ending at 80° C. Total time is 2.5 hours. After cooling, the autoclave content is filtered through a precoated funnel. The filtrate is evaporated to about 750 ml, treated with 5.4 liters of acetone and cooled in a freezer for one hour. The precipitate is separated by filtration through a Büchner funnel and dried. 427 g of product is obtained.

Thin layer chromatography indicates good purity. The C-NMR spectrum corresponds to the expected structure. The m.p. is 155° C. (dec).

EXAMPLE 4

Synthesis of N-Cyclohexyl Glycine 338 g of glycine (4.5 mols) is dissolved in 1.5 liters of deionized water. The solution is put into a 1-gallon autoclave. 25 g of 10% Pd on C, 551 g of cyclohexanone (5.6 mols) and 500 ml of ethanol are added. Hydrogenation is carried out at 60° C. between 56.2 and 70.3 kg/cm$^2$. In the course of three hours a pressure drop corresponding to 98.4 kg/cm$^2$ is observed.

The products obtained in two batches like the above are combined and filtered through a precoated funnel. The filtrate is evaporated to about 2 liters and treated with an excess of acetone. The precipitate is separated by filtration through a Büchner funnel and dried in vacuo. 1265 g of product is obtained, showing good purity by thin-layer chromatography. Elemental analysis gives:

$C = 60.43\%$; $H = 9.60\%$; $N = 9.12\%$;
the theoretical values being
$C = 61.2\%$; $H = 9.55\%$; $N = 8.92\%$.

EXAMPLE 5

Synthesis of N-Isopropyl Glycine 338 g of glycine (4.5 mols) is dissolved in 1.5 liters of deionized water and put into a 1-gallon autoclave. 325 g of acetone and 8 g of 10% Pd on C are added.

Hydrogenation is carried out at 70°–90° C. between 63.3 and 77.3 kg/cm². A pressure drop equivalent to 59 kg/cm² occurs within four hours. After cooling, the autoclave content is filtered, the filtrate is evaporated to 750 ml and treated with an excess of acetone. The precipitate is separated on a Büchner funnel and dried in vacuo. 506 g of product is obtained. Analysis by thin-layer chromatography shows good purity.

EXAMPLE 6

Synthesis of N-sec. Butyl Glycine 338 g of glycine (4.5 mols), 1.5 liters of methanol, 15 g of 10% Pd on C, wet with water, and 500 g of methyl-ethylketone (6.93 mols) are charged into the autoclave.

Hydrogenation is carried out at 110°–112° C. between 63.3 and 84.4 kg/cm². Within three hours a drop in pressure equivalent to 69.6 kg/cm² is observed. After cooling, the autoclave content is filtered through a precoated filter paper. Thin-layer chromatography does not show any glycine. The filtrate is evaporated to about 1 liter and combined with the filtrate coming from an experiment carried out under the same conditions. Treatment with an excess of acetone causes precipitation. The solid is separated on a Büchner funnel and dried in vacuo. 1100 g of product is obtained. Elemental analysis gives the following values:

$C = 55.3\%$; $H = 10.14\%$; $N = 10.65\%$;
the theoretical values being:
$C = 54.9\%$; $H = 9.99\%$; $N = 10.7\%$.

We have discovered that mixtures of mono (secondary) and dialkyl (tertiary) amino acids are effective activators for $K_2CO_3$ in $CO_2$ removal and the combination of two amino acids is more effective than either alone. The tertiary amino acid can be prepared from secondary amino acids by alkylation. For example, n-butyl sarcosine can be prepared quite effectively via the reductive alkylation of sarcosine with butyraldehyde.

Such a tertiary amino acid in combination with a hindered secondary amino acid such as isopropyl glycine or sec.-butylglycine, etc., is an extremely effective $K_2CO_3$ activator for acid gas scrubbing.

Tertiary amino acids can be prepared with some difficulty from ketones and a non-hindered secondary amino acid by alkylation to introduce an additional alkyl group. For example, the reductive alkylation of an unhindered amino acid with a ketone can give tertiary amino acid.

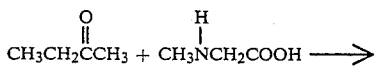

-continued

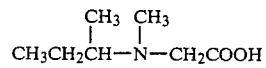

These tertiary amino acids such as N-methyl-N-secondary butylglycine are extremely effective in combination with a secondary amino acid such as N-sec.-butylglycine.

One disadvantage to this approach is that the alkylation proceeds with some difficulty. Another is that monoalkyl amino acids like sarcosine are considerably more expensive than glycine, and it would be desirable to use glycine as the starting material. This can be accomplished if one first alkylates glycine with a ketone by reductive condensation to produce the sterically hindered monoalkyl (secondary) amino acid. For example, as shown by the equation:

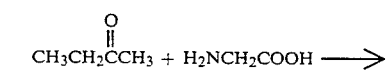

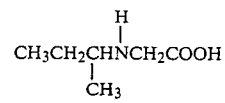

Such sterically hindered secondary alkyl amino acids will not react further even when excess ketone is used. However, if an unhindered aldehyde such as formaldehyde is introduced, N-secondary butyl glycine is converted to a tertiary amino acid such as N-secondary butyl-N-methylglycine as shown by the following equation:

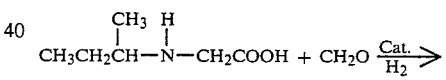

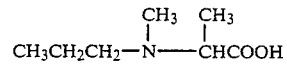

Thus, both the secondary and tertiary amino acid can be synthesized inexpensively and readily from glycine.

What is even more attractive is that a desirable "one pot" direct synthesis of the mixture is now possible. Glycine can be reacted with excess ketone to form the sterically hindered amino acid and an aldehyde can then be charged into the reaction vessel in the desired proportion to produce a mixture of secondary and tertiary amino acids. This mixture need not be isolated and can be prepared in an aqueous solution which can be used directly for the purpose of $K_2CO_3$ activation in acid gas scrubbing. Another attractive feature of these amino acid promoted systems in contrast to the combination of the N-cyclohexyl-1,3-propanediamine/pipecolinic acid as shown in U.S. Pat. No. 4,094,957 is that the amino acid combination is non-foamy. Thus, the need of adding an antifoam is minimized or eliminated.

The following examples illustrate the preparation of the tertiary amino acids by the process of the present invention.

EXAMPLE 7

Synthesis of N-Methyl N-Secondary Butyl Glycine (MSBG)

Into a one-gallon autoclave 338 g (4.5 mole) glycine, 1.2 liters methanol, 10 g 10% Pd/C and 500 g methylethylketone were combined. The reaction mixture was pressurized to 77.3 kg/cm$^2$ and heated between 105°–115° C. Pressure was maintained between 63.3 and 77.3 kg/cm$^2$ and after about two hours 63.3 kg/cm$^2$ hydrogen was consumed. The autoclave was cooled and 180 g (6 moles) paraformaldehyde and 5 g 10% Pd/C added and repressurized with about 77.3 kg/cm$^2$ hydrogen. The vessel was heated and 75.2 kg/cm$^2$ of hydrogen was consumed within 1.5 hours and a maximum temperature of 123° C.

The product was concentrated to 800 ml volume by heating up to 125° C., and two liters of acetone and 5 l of ether were added. No solids were formed and the solution was concentrated to 1.2 liters, diluted to 4.3 liters with acetone and cooled in a freezer. No solids formed so the solution was concentrated at 118° C. to 150 ml and placed in a dish in an oven at 75°–80° C. for two days and then cooled in a dry box. The waxy crystalline MSBG weighed 847 g, 99% yield. The product was purified by stirring with 2.5 liters acetone plus 500 ml ether. The mixture was cooled for 3 hours. The solid was filtered and washed with ether and dried in a 45° C. oven giving 485 g of product, 74% yield.

EXAMPLE 8

Synthesis of N-Methyl N-Secondary Butyl Glycine Aqueous Solutions

Into a one-gallon autoclave 338 g (4.5 mole) glycine, 1 liter H$_2$O, 10 g 10% Pd/C, and 500 g methylethylketone were combined and hydrogenated as in Example 7. At 110° C., 52.7 kg/cm$^2$ of hydrogen was consumed in 3.5 hours. After cooling 365 g of 37% (4.5 moles) aqueous formaldehyde was added. The hydrogen pressure was maintained between 63.3 and 77.3 kg/cm$^2$ while heating and 52.7 kg/cm$^2$ hydrogen was consumed below 65° C. within about 1.5 hours. The resulting solution was filtered and concentrated on a hot plate to about 1200 ml. 1272 g of a solution containing 52.7% solids (theory 51.3% solids) was obtained.

EXAMPLE 9

Synthesis of N-Methyl N-Secondary Butyl Glycine/N-Secondary Butyl Glycine Mixtures in Aqueous Solutions Mixtures of SBMG and SBG of any desired ratio can be prepared directly and where aqueous solutions are desired the product mixture can be obtained as an aqueous concentrate and diluted before use. The following procedure is for an equimolar solution of the two.

Into a one-gallon autoclave 506 g (6.75 mole) glycine, 750 ml methanol, 15 g 10% Pd/C, and 750 g methylethylketone were combined and hydrogenated between 63.3 and 77.3 kg/cm$^2$ hydrogen. Within 2 hours at up to 112° C., 87.9 kg/cm$^2$ hydrogen was consumed. After cooling 274 g (3.375 mole) of 37% formaldehyde and 5 g 10% Pd/C were added. The reaction consumed 49.2 kg/cm$^2$ of hydrogen in 45 minutes at up to 42° C. The resulting solution was filtered warm and 946 g of distillate removed until a head temperature of 95° C. was obtained. The residual solution weighed 1244.5 g (75% solids).

The following examples illustrate the use of the sterically hindered mono-substituted and tertiary amino acids as promoters in the "hot pot" acid gas treating process.

EXAMPLE 10

Synthesis of N-Sec. Butyl Glycine

The following reagents are charged into a 1 gallon autoclave:
676 g of glycine (9 moles)
721 g of methylethylketone (10 moles)
1110 ml of water
20 g of 10% Pd on charcoal The autoclave is closed and hydrogenation is carried out at 100° C. while keeping the pressure at 77.3 kg/cm$^2$ for 2.5 hours. An amount of hydrogen corresponding to 182.8 kg/cm$^2$ is consumed during the 2.5 hours. Thin layer chromtography shows traces of glycine. Th autoclave is cooled to room temperature, 100 ml of methylethylketone is added and the autoclave is repressurized to 77.3 kg/cm$^2$ at 100°–105° C. An amount of hydrogen corresponding to a pressure drop of 14.06 kg/cm$^2$ is consumed in the course of 3 hours. Thin layer chromatography shows no glycine.

The autoclave is cooled to room temperature and degassed. The catalyst is separated by repeated filtration. The filtrate weighs 2872.2 g. The N-sec. butyl glycine content, determined by high pressure liquid chromatography is 36.4%. No major impurity can be seen.

The above example shows that N-sec. butyl glycine can be prepared in water alone as the polar solvent. The use of water alone eliminates the necessity of removing low boiling alcohols from the final product.

EXAMPLE 11

Synthesis of N-Methyl N-Secondary Butyl Glycine

Into a four-liter autoclave 506.3 g glycine, 750 ml water, 750 ml methylethyl ketone were combined with 15 g 10% Pd/C catalyst. Hydrogenation was carried out at 100° C. by pressurizing initially to about 84.36 kg/cm$^2$ and repressurizing back to this level so that pressure was maintained between 63.27 and 84.36 kg/cm$^2$ had occurred until a total change in pressure of 59.755 kg/cm$^2$ after which hydrogen absorption diminished appreciably all of which takes 3.75 hours. After cooling to 40° C. the mixture was tested by thin layer chromatography, and the absence of glycine indicated complete reaction.

Thereafter, 584 g of 37% formaldehyde was added. The autoclave was pressured to 84.36 kg/cm$^2$ H$_2$ and repressured to this level after dropping to about 42.18 kg/cm$^2$ until 73.8 kg/cm$^2$ of H$_2$ had been absorbed which took 0.75 hour. Drying hydrogenation the temperature rose from 40° to 50° C. and hydrogen uptake diminished appreciably when the exotherm ceased. Thin layer chromatography showed the absence of N-sec. butyl glycine.

The product solution weighed 2674.5 g and contained 36.6% solids (979.3 g of N-methyl N-secondary butyl glycine).

This example shows that both N-sec. butyl glycine and N-methyl-N-secondary butyl glycine are conveniently synthesized in the presence of water as the polar solvent in the absence of alcohols. In a similar manner potassium glycinate may be used in place of glycine.

EXAMPLE 12

"Hot Pot" Acid Gas Treating Process

The reaction apparatus consists of an absorber and a desorber as shown in FIG. 1 of U.S. Pat. No. 4,112,050 incorporated herein by reference. The absorber is a vessel having a capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents are put into a 2-liter Erlenmeyer flask:
55 g of N-cyclohexyl-1,3-propanediamine (CHPD)
22.8 g of N-sec. butyl glycine (SBG)
225 g of $K_2CO_3$
447 g of water When all solid has dissolved, the mixture is put into the absorber and brought to 80° C. The apparatus is closed and evacuated until the liquid begins to boil. At this point $CO_2$ is admitted. In total, 39.1 liters of $CO_2$ is absorbed.

The rich solution is transferred to the desorber and boiled for one hour, during which time 30 liters of $CO_2$ is desorbed.

The regenerated solution so obtained is transferred back to the absorber and cooled to 80° C. The apparatus is closed and evacuated until the liquid begins to boil. At this point $CO_2$ is admitted. 33 liters of $CO_2$ is absorbed, of which 12 liters is absorbed in the first minute.

If the above cycle is repeated, replacing N-sec.-butyl glycine with 22.5 g of pipecolinic acid, the amount of $CO_2$ desorbed is 28.5 liters and the amount of $CO_2$ reabsorbed is 31.3 liters.

The rich solution containing $K_2CO_3$, N-cyclohexyl-1,-3-propanediamine and N-sec. butyl glycine is regenerated by boiling it for an hour, and is then used for a phase-behavior study.

About 600 g of regenerated solution is charged into a 1-liter autoclave equipped with a Herculite window, reflux condenser and inlet and outlet for gases. The autoclave is brought to 121° C. while blowing therethrough a mixture containing 0.2% $CO_2$ and 99.8% He at about 0.2 liters/minute. When the outgoing gas has the same composition as the entering gas, equilibrium is reached. Only one phase is present.

If the experiment is repeated, replacing N-sec. butyl glycine with water, two liquid phases are present at equilibrium.

EXAMPLE 13

Using the apparatus described in Example 12, the following two experiments are carried out to demonstrate the use of (a) N-secondary butyl glycine (b) the blend of N-secondary butyl glycine (SBG) and N-methyl N-secondary butyl glycine (MSBG) as the sole promoters for potassium carbonate in the "hot pot" acid gas treating process.

(a) The following reagents are put into a 2 liter Erlenmeyer flask:
92 g of N-sec. butyl glycine
225 g of $K_2CO_3$
433 g of $H_2O$ When all solid has dissolved, the mixture is put into the absorber and brought to 80° C. The apparatus is closed and evacuated until the liquid begins to boil. At this point $CO_2$ is admitted. In total, 32 liters is absorbed.

The rich solution is transferred to the desorber and boiled for an hour, during which time 28 liters of $CO_2$ is desorbed.

The regenerated solution so obtained is transferred back to the absorber and cooled to 80° C. The apparatus is closed and evacuated until the liquid begins to boil. At this point $CO_2$ is admitted. 29.6 liters of $CO_2$ is absorbed, of which 13 liters is absorbed in the first minute.

(b) The following reagents are put into a 2 liter Erlenmeyer:
46 g of N-sec. butyl glycine (SBG)
51 g of N-methyl N-sec. butyl glycine (MSBG)
225 g of $K_2CO_3$
428 g of $H_2O$ When all solid has dissolved, the mixture is put into the absorber and brought to 80° C. The apparatus is evacuated until the liquid begins to boil. Then $CO_2$ is admitted and the rate of absorption and the total capacity are measured. Regeneration is carried out as above. The regenerated solution absorbed 32.5 liters of $CO_2$, with about 12 liters being absorbed in the first minute.

EXAMPLE 14

(a) Aging Studies in $CO_2$ Scrubbing Apparatus

The following experiments are carried out to ascertain the stability of the amino acids under accelerated-simulated acid gas treating conditions.

The following reagents are charged into a stainless-steel bomb:
121 g of N-sec. butyl glycine
433 g of $KHCO_3$
540 g of $H_2O$ The bomb is put into an oven and heated at 120° C. for 1000 hours. Then the content is discharged into a 2 liter flask and refluxed for several hours.

750 g of the refluxed material is taken and subjected to an absorption-desorption-reabsorption cycle as described in Example 13. 27.9 liters of $CO_2$ is absorbed into the regenerated solution, with 10 liters being absorbed in the first minute.

Comparison of this result with that obtained with the fresh solution, described in Example 13, shows that the aging process does not lead to a significant loss of activity.

If the aging experiment is carried out after replacing N-sec. butyl glycine with the equivalent amount of N-cyclohexyl glycine, 145 g, and reducing the water to 516 g in order to have the same total weight, a considerable amount of solid, identified as 1,4-biscyclohexyl-2,5-diketopiperazine is formed. An attempt to carry out an absorption-desorption cycle causes plugging of the unit.

Aging Under $CO_2$ and $H_2S$

The following reagents are charged into a stainless-steel bomb:
121 g of N-sec. butyl glycine
24 g of $K_2S$
390 g of $KHCO_3$
544 g of water The bomb is put into an oven and heated at 120° C. for 1000 hours. Then the content is discharged into a 2 liter flask and refluxed for several hours.

765 g of the refluxed material is taken and subjected to an absorption-desorption-reabsorption cycle as described in Example 13. 28.9 liters of $CO_2$ is absorbed into the regenerated solution, with 10 liters being absorbed in the first minute. Comparison of this result with that obtained with the fresh solution, described in Example 13, shows that the aging process leads to only a slight loss of activity.

The excellent stability under the aging conditions shown above for the N-secondary butyl glycine coupled with its good performance as a promoter, especially in combination with N-secondary butyl N-methyl glycine, demonstrates the desirability of using this combination of amino acids rather than N-cyclohexyl-1,3-propanediamine and pipecolinic acid or N-cyclohexylglycine.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A composition comprising a mixture of amino acids and alkali metal salts thereof comprising amino acids and salts represented by the formulae:

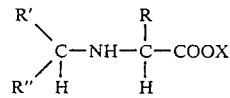

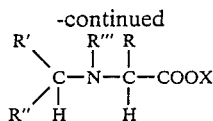

wherein R is hydrogen or methyl, X is hydrogen or an alkali metal and R' and R" are each selected from the group consisting of:
   (a) substituted or unsubstituted, linear or branched, alkyl radicals having one to twenty carbon atoms;
   (b) substituted or unsubstituted alkylene radicals each having three to six carbon atoms and R' and R" together forming a cyclic ring;
   (c) substituted or unsubstituted cycloalkyl radicals having from four to eight ring carbon atoms;
   (d) substituted or unsubstituted, hydroxy-alkyl radicals, linear or branched, having from one to twenty carbon atoms;
   (e) substituted or unsubstituted aralkyl radicals having from seven to twenty carbon atoms, and
   wherein R''' is selected from the group consisting of substituted or unsubstituted linear alkyl radicals having from one to twenty carbon atoms; and wherein the substituent group of (a) thru (e) above, are selected from the group consisting of hydroxyl groups, ether linkages, silane groups, and heterocyclic rings containing oxygen in their rings.

2. The composition of claim 1 wherein the mole ratio of the two amino acids ranges from 1:3 to 3:1.

3. The composition of claim 1 wherein R is hydrogen or a methyl radical, and R' and R" are each selected from the group consisting of $C_1$-$C_6$ hydrocarbon radicals and R''' is a methyl or ethyl radical.

4. The composition of claim 5 wherein R is hydrogen, R' and R" are each selected from the group consisting of $C_1$-$C_3$ hydrocarbon radicals and R''' is a methyl radical.

5. A composition comprising N-secondary butyl glycine and N-secondary butyl N-methyl glycine and their alkali metal salts.

6. The composition of claim 5 wherein the mole ratio of the two amino acids or their salts ranges from 1:3 to 3:1.

* * * * *